US009182552B2

(12) United States Patent
Beausoleil et al.

(10) Patent No.: US 9,182,552 B2
(45) Date of Patent: Nov. 10, 2015

(54) OPTICAL CONNECTIONS

(75) Inventors: Raymond G. Beausoleil, Redmond, WA (US); David A. Fattal, Mountain View, CA (US); Marco Fiorentino, Mountain View, CA (US); Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/357,841

(22) PCT Filed: Dec. 9, 2011

(86) PCT No.: PCT/US2011/064128
§ 371 (c)(1),
(2), (4) Date: May 13, 2014

(65) Prior Publication Data
US 2014/0308006 A1     Oct. 16, 2014

(51) Int. Cl.
G02B 6/34       (2006.01)
G02B 6/28       (2006.01)
G02B 6/293      (2006.01)
G02B 6/38       (2006.01)

(52) U.S. Cl.
CPC ............ *G02B 6/34* (2013.01); *G02B 6/29304* (2013.01); *G02B 6/3845* (2013.01); *G02B 6/3885* (2013.01); *Y10T 29/49826* (2015.01)

(58) Field of Classification Search
CPC .................................................. G02B 6/29304
See application file for complete search history.

(56) References Cited

U.S. PATENT DOCUMENTS

| | | | |
|---|---|---|---|
| 6,826,343 B2 | 11/2004 | Davis et al. |
| 7,535,631 B2 | 5/2009 | Brown et al. |
| 8,070,366 B1 | 12/2011 | Thorson et al. |
| 2009/0262779 A1 | 10/2009 | Andrejco et al. |
| 2010/0092125 A1 | 4/2010 | Kilic et al. |
| 2010/0278488 A1 | 11/2010 | Miyazaki |
| 2011/0129231 A1 | 6/2011 | Fiorentino et al. |
| 2011/0188805 A1 | 8/2011 | Fu et al. |

FOREIGN PATENT DOCUMENTS

| | | |
|---|---|---|
| KR | 20010001994 A | 1/2001 |
| KR | 20050074276 A | 7/2005 |
| WO | WO-2011037563 | 3/2011 |

OTHER PUBLICATIONS

Feng, J. et al., High Efficiency Compact Grating Coupler for Integrated Optical Circuits, 2006, Proc. of SPIE, vol. 6351, Issue 86, pp. 1-9.
Halir, R. et al., Waveguide Grating Coupler with Subwavelength Microstructures, 2009, Optics InfoBase, Optics Letters, vol. 34, Issue 9, pp. 1408-1410.
International Search Report & Written Opinion, Aug. 23, 2013, PCT Patent Application No. PCT/US2011/064128, 11 pages.

*Primary Examiner* — Jerry Rahll
(74) *Attorney, Agent, or Firm* — Hewlett-Packard Patent Department

(57) ABSTRACT

Techniques related to optical devices are described herein. In an example, an optical device includes (a) an input optical channel and a corresponding output optical channel, and (b) an assembly of sub-wavelength grating layers aligned to optically couple the input optical channel to the output optical channel.

19 Claims, 11 Drawing Sheets

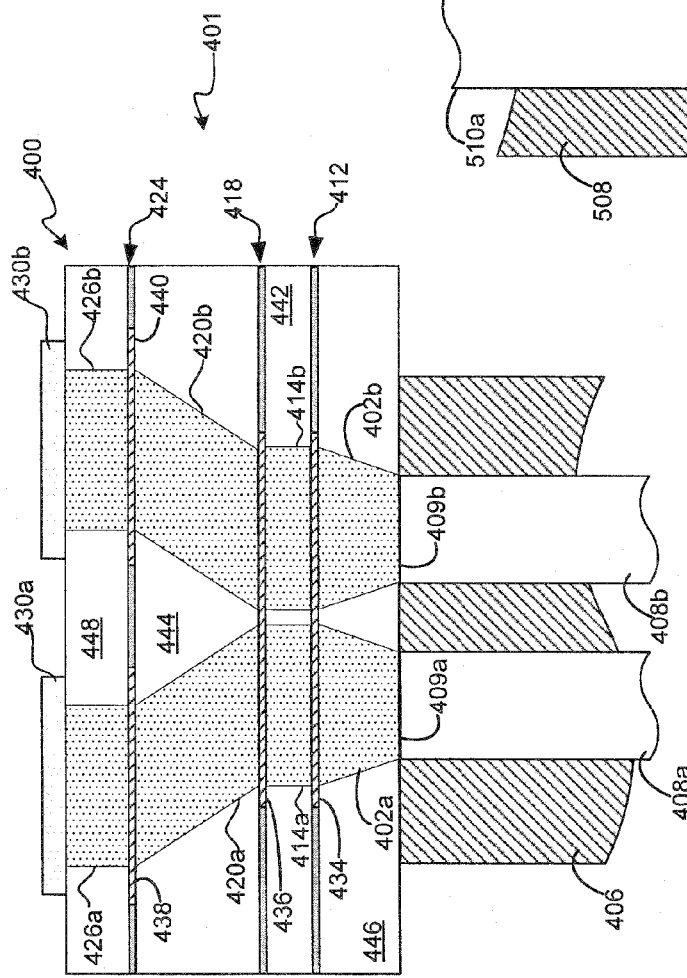

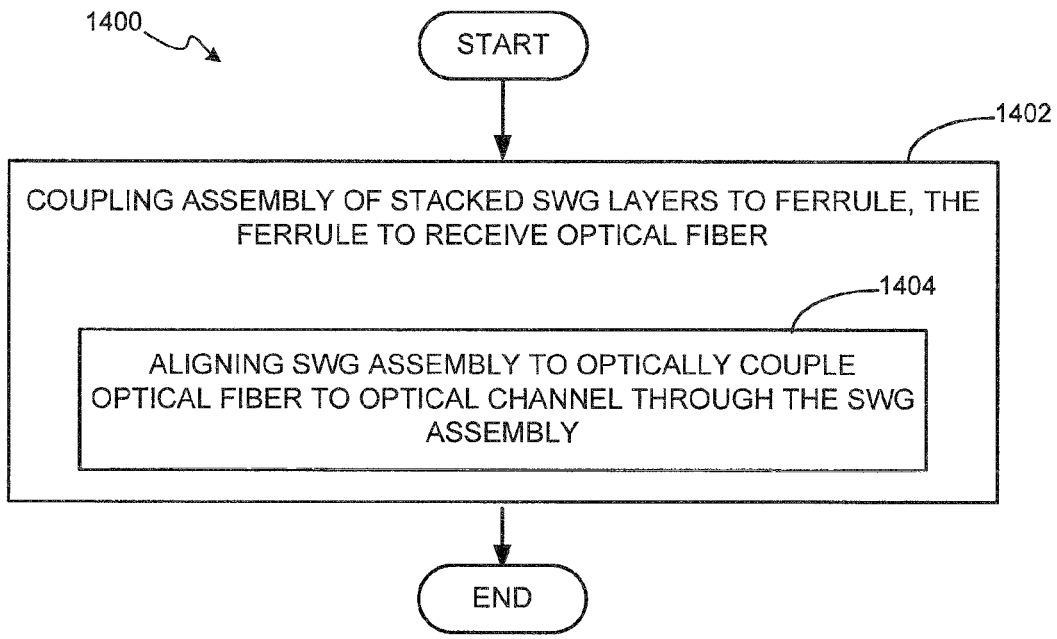
FIG. 14
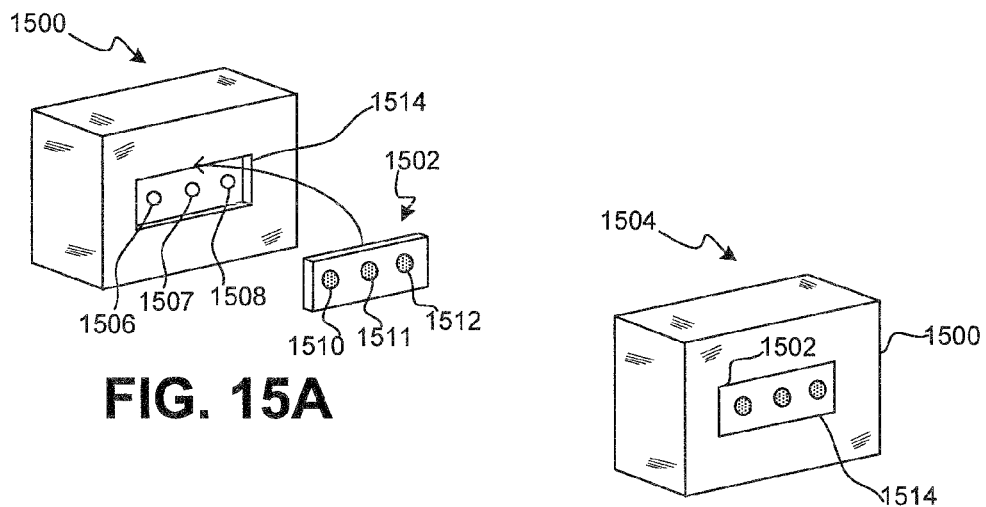
FIG. 15A
FIG. 15B

OPTICAL CONNECTIONS

CROSS-REFERENCE TO RELATED APPLICATION

This application is a U.S. National Stage Application of and claims priority to International Patent Application No. PCT/US2011/064128, filed on Dec. 9, 2011, and entitled "OPTICAL CONNECTIONS".

BACKGROUND

Multiple applications rely on optical interconnections. For example, transmission of high-resolution videos over the internet demands a high network bandwidth. Optical fibers may be used for transmitting data over vast distances providing high network bandwidth. Further, supplying data with an optical fiber facilitates maintaining high bandwidth all the way to the end-user without compromising power consumption. In order to serve a high number of users, data may be transmitted using a multiple terminal (MT) optical communication system. One approach to implement a MT optical communication system is to use bundles of optical fibers. Each optical fiber may carry signals for transmitting data to multiple users (e.g., 64 end-users). Another approach is to use multicore optical fiber, in which an optical fiber includes a plurality of cores, each core carrying signals for transmitting data to multiple users. For example, a multicore design may include seven cores; one core may carry a signal to 64 end-users so that the multicore can carry signals for 448 end-users.

Optical fiber connectors may be used where a connect/disconnect capability is required in an optical communication system. Optical connectors may be used to, for example, connect equipment, interconnect optical fibers, or cross-connect optical cables within a system. In an optical connector, mating ferrules may receive fibers in fixed positions such that two optical fibers mate in coaxial alignment to effect an interconnection. Such connectors may require point-to-point contact of optical fibers or implementing optical alignment using additional optical components (e.g., lenses). Optical connectors may be designed for MT optical communication systems. For example, MT optical connectors may be designed to interconnect multicore optical fibers, bundles of optical fibers, or MT optical equipment.

Optical connectors may be susceptible to environmental conditions or mechanical instabilities. Further, at least some types of optical connectors may be relatively expensive to manufacture in particular if they include additional optical elements such as lenses. Moreover, in order to assure high interconnection precision, a connector may require a number of high-precision components to be assembled together. Optical connectors may be susceptible to contamination, in particular when implementing optical alignment using lenses. MT optical connectors are generally more prone to these issues than single terminal connectors.

BRIEF DESCRIPTION OF THE DRAWINGS

In order that the present disclosure may be well understood, various examples will now be described with reference to the following drawings.

FIG. 4 is a schematic cross-sectional view of a portion of an optical connector in operation to control light beams according to an example.

FIG. 5 is a schematic cross-sectional view of a portion of an optical connector in operation to control light beams according to another example.

FIG. 14 shows a diagram depicting a process flow for manufacturing an optical fiber connector according to an example.

FIG. 15A is a schematic isometric view of a ferrule for a MT connection and a SWG assembly decoupled from the ferrule according to an example. FIG. 15B is a schematic isometric view of a MT optical connector including the ferrule with the SWG assembly coupled thereto according to an example.

Figure 1:
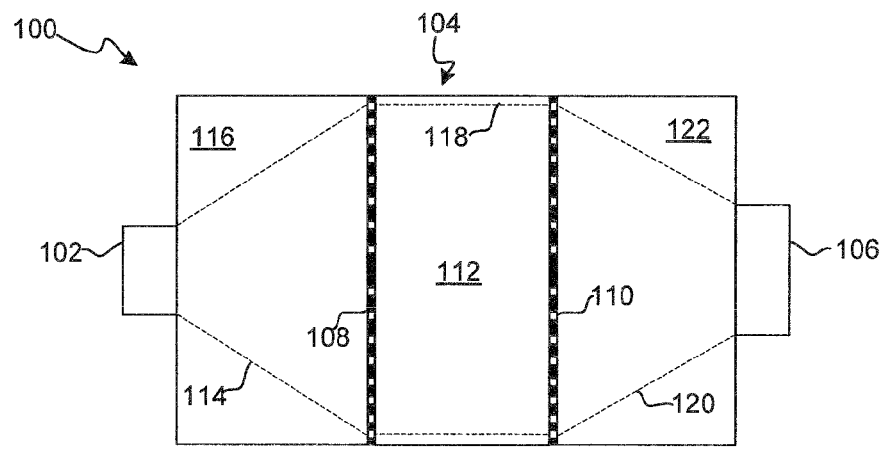
FIG. 1 is a schematic cross-sectional view of an optical device according to an example herein.

In the drawings, the dimensions of layers and regions are exaggerated for clarity of illustration.

DETAILED DESCRIPTION

In the following description, numerous details are set forth to provide an understanding of the examples disclosed herein. However, it will be understood that the examples may be practiced without these details. Further, in the following detailed description, reference is made to the accompanying figures, in which various examples are shown by way of illustration. In this regard, directional terminology, such as "top," "bottom," "front," "back," "left," "right," "vertical," etc., is used with reference to the orientation of the figures being described. Because disclosed components can be positioned in a number of different orientations, the directional terminology is used for purposes of illustration and is in no way limiting. Like numerals are used for like and corresponding parts of the various figures. While a limited number of examples are illustrated, it will be understood that there are numerous modifications and variations therefrom.

In the following description, the term "light" refers to electromagnetic radiation with wavelength(s) in the visible and non-visible portions of the electromagnetic spectrum, including infrared and ultra-violet portions of the electromagnetic spectrum. The term "light beam" refers to a ray of light including one or more spectral components. The term "wavefront" refers to the locus (i.e., a line or, in a wave propagating in three dimensions, a surface) of points in a light beam having the same phase. The term "stack" refers to an ordered heap of SWG layers. Spacers may be interposed between the SWG layers of a stack. It will be understood that when a layer or film is referred to or shown as being 'between' two layers or films, it can be the only layer or film between the two layers or films, or one or more intervening layers or films may also be present.

As set forth above, optical devices may implement optical components for facilitating inter-connectivity. For example, a lens arrangement in a beam expansion connector may improve connector resilience. However, such optical components may result in a bulky design of the connector. Further, such optical components may significantly increase manufacturing costs. Last but not least, such optical components may be prone to suffer contamination. For example, void spaces between lenses tend to become contaminated.

Optical devices are described herein that include sub-wavelength grating (SWG) layers arranged to conveniently facilitate inter-connectivity between optical channels. More specifically, as illustrated by FIG. 1, an optical device 100 may include the following elements: (i) an input optical channel 102; (ii) an assembly 104 of stacked SWG grating layers 108, 110; and (iii) an output optical channel 106.

In the illustrated example, input optical channel 102 and output optical channel 106 have different dimensions, namely they have different diameters. SWG assembly 104 is arranged to conveniently adjust the beam diameter coupled to output optical channel 106.

Input optical channel 102 and output optical channel 106 may correspond to, for example, optical fiber ends, inputs or outputs of photonic integrated circuits or optical transceivers, or ends of cores of a multicore optical fiber. As illustrated in FIGS. 3 to 6, an optical device as described herein may be a connector for optical fiber. Optical devices as described herein are not limited to optical fiber connectors. Any optical devices implementing interconnectivity between optical channels are contemplated such as interconnecting portions of photonic integrated circuits (PIC), light transducers, or connectors for other types of waveguides. In some examples, a multiple terminal (MT) optical connector is illustrated that interconnects optical channels corresponding to a plurality of terminals.

Continuing to refer to FIG. 1, SWG assembly 104 includes a first SWG layer 108, a second SWG layer 110, and a spacer 112 interposed therebetween. SWG layers 108, 110 are disposed parallel to each other. Further, spacer 112 defines the relative arrangement between the SWG layers, which are aligned to optically couple input optical channel 102 and output optical channel 106. The SWG layers can be composed of any suitable material, such as semiconductor including silicon ("Si"), gallium arsenide ("GaAs"), indium phosphide ("InP"), silicon carbide ("SiC"), or a combination thereof. In examples herein, a spacer is comprised of a solid material for separating adjacent SWG layers. The spacers may be composed of a suitable polymer or another dielectric material such as a transparent silicon oxide. A spacer may have a refractive index lower than for an adjacent SWG layers. As detailed below, a spacer may include a substrate on which one or more SWG layers are formed.

A SWG layer refers to a layer that includes a diffraction grating with a pitch that is sufficiently small to suppress all but the $0^{th}$ order diffraction. In contrast thereto, conventional wavelength diffraction gratings are characterized by a pitch that is sufficiently high to induce higher order diffraction of incident light. In other words, conventional wavelength diffraction gratings split and diffract light into several beams travelling in different directions. A pitch of a SWG layer may range from 10 nm to 300 nm or from 20 nm to 1 µm. How the SWG layer refracts an incident beam may be determined at manufacturing by properly selecting the dimensions of the diffractive structure of the SWG.

As detailed below in Section CONFIGURING SUB-WAVELENGTH GRATINGS, a SWG layer may be arranged to control and/or shape an incident beam. More specifically, SWGs with a non-periodic, sub-wavelength pattern may be configured to impart an arbitrary phase front on the impinging beam. Thereby, a SWG layer may be used to implement a vast variety of optical functionalities similarly as other, more conventional, optical components (e.g., lenses, prisms, mirrors, polarizers, beam splitters, or optical filters).

Referring back to FIG. 1, device 100 may operate as follows. Input optical channel 102 may emit a diverging light beam 114. Beam 114 may originate from an optical fiber (not shown) coupled to input optical channel 102. Diverging beam 114 propagates through medium 116. Medium 116 may be comprised of a solid layer (e.g., a transparent oxide layer) integrated in SWG assembly 104. Medium 116 comprised of a solid layer prevents that contamination enters into the optical path of device 100. In some examples, medium 116 is air or any other material that suitably transmits light.

Diverging beam 114 impinges on first SWG layer 108. First SWG layer 108 is arranged to collimate diverging beam 114 into a collimated beam 118. Collimated beam 118 propagates through spacer 112 and impinges on second SWG layer 110. Second SWG layer 110 is arranged to converge collimated beam 118 towards output optical channel 106. Converging beam 120 propagates through medium 122, which may be constituted similarly to medium 116, and impinges on output optical channel 106. As illustrated, the diameter of converging beam 120 at output channel 106 corresponds to the channel diameter.

SWGs layers 108, 110 are implemented as stacked layers. Thereby, a compact implementation of specific optical functionalities in device 100 is facilitated. Moreover, optical devices described herein implement these particular optical functionalities using a SWG assembly that can be mass-produced. Moreover, SWG assembly 104 does not compromise an accurate optical alignment since SWG layers may be easily fabricated using micro-fabrication procedures and high volume production methods such as standard CMOS processes or roll-to-roll imprinting.

Some examples implement a MT optical device. By way of example, a MT optical device may be designed for any of the following applications: interconnecting multicore optical fibers; interconnecting bundles of optical fibers; connecting MT optical fiber arrangements (e.g., implementing multicore fibers or optical fiber bundles) to a PIC or an optical transceiver; splicing MT optical fiber arrangements; or interconnecting PICs or optical transceivers with multiple terminals.

Figure 2:
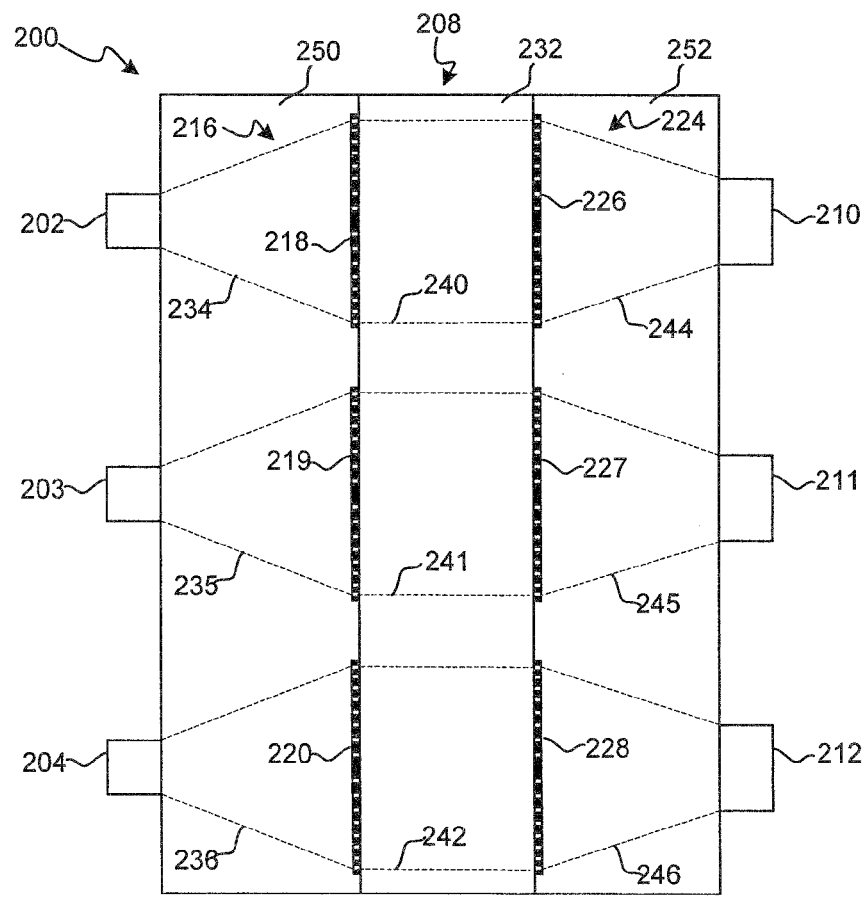
FIG. 2 is a schematic cross-sectional view of a MT optical device according to an example herein.

A MT optical device includes a plurality of input optical channels and a plurality of corresponding output optical channels. One input optical channel and its corresponding output optical channel implement one terminal FIG. 2 is a schematic cross-sectional view of a MT optical device 200 according to an example herein. MT optical device 200 includes input optical channels 202-204, a SWG assembly 208, and output optical channels 210-212. Input optical channels 202-204 and output optical channels 210-212 may correspond to, for example, optical fiber ends of a bundle of optical fibers, ends of cores of a multicore optical fiber, inputs or outputs of photonic integrated circuits. In the illustrated example, input optical channels 202-204 have a different dimension than output optical channels 210-212, namely they have different diameters. SWG assembly 208 is arranged to conveniently adjust the beam diameter coupled to output optical channel 210-212.

According to some examples, a MT optical device may include a SWG assembly as described above. SWG assembly 208 includes a first array 216 of SWG layers 218-220 and a second array 224 of SWG layers 226-228. Arrays 216 and 224 are stacked with a spacer 232 disposed therebetween. In the illustrated example, the SWG layers in one of the SWG layers are formed separated from each other. In alternative examples, the SWG layers in one of the SWG arrays are continuously formed as a single layer contiguous to spacer 232.

According to examples herein, a SWG assembly in a MT device is aligned to optically couple input optical channels to output optical channels so as to implement optical connectivity for each terminal. As illustrated in FIG. 2, SWG layers may be disposed opposite to each other so as to interconnect corresponding channels in one terminal similarly as described above with respect to FIG. 1. For example, SWG layer 218 is disposed opposite to SWG layer 226 with a portion of spacer 232 build in-between. Further, SWG assembly 208 is aligned to optically couple input optical channels 202-204 to output optical channels 210-212. More specifically, each of the SWG layers in first array 216 corresponds to one of the input optical channels and is aligned therewith (e.g., SWG layer 218 is aligned with input optical channel 202); each of the SWG layers in second array 224 corresponds to one of the output optical channels and is aligned therewith (e.g., SWG layer 226 is aligned with output optical channel 210).

In the particular example shown in FIG. 2, SWG array 216 corresponds to a SWG sub-assembly arranged to collimate diverging beams 234-236 emitted from input optical channels 202-204 into beams 240-242; SWG array 216 corresponds to a SWG sub-assembly arranged to converge collimated beams 240-242 into converging beams 244-246 directed towards output optical channels 210-212.

Using stacked SWG layers as interconnecting optical elements facilitates a compact design of MT devices. Moreover, such stacked SWG layers can be fabricated in a simple manner without compromising optical alignment in one terminal. Further, spacers in the SWG arrangement prevent contamination within a MT device, since void spaces are reduced between the optical elements. For example, a solid layer 250 may be provided in-between input optical channels 202-204 and SWG layers 218-220; a solid layer 252 may be provided in-between SWG layers 226-228 and output optical channels 210-212. Solid layers 250, 252 and SWG assembly 208 may be manufactured as a single integrated structure using microfabrication techniques.

As set forth above, a MT optical device as described herein may be configured to interconnect a multicore optical fiber with other optical devices (e.g, another optical fiber, a PIC or an optical transceiver, or single optical fibers in a splicer).

Figure 3A:
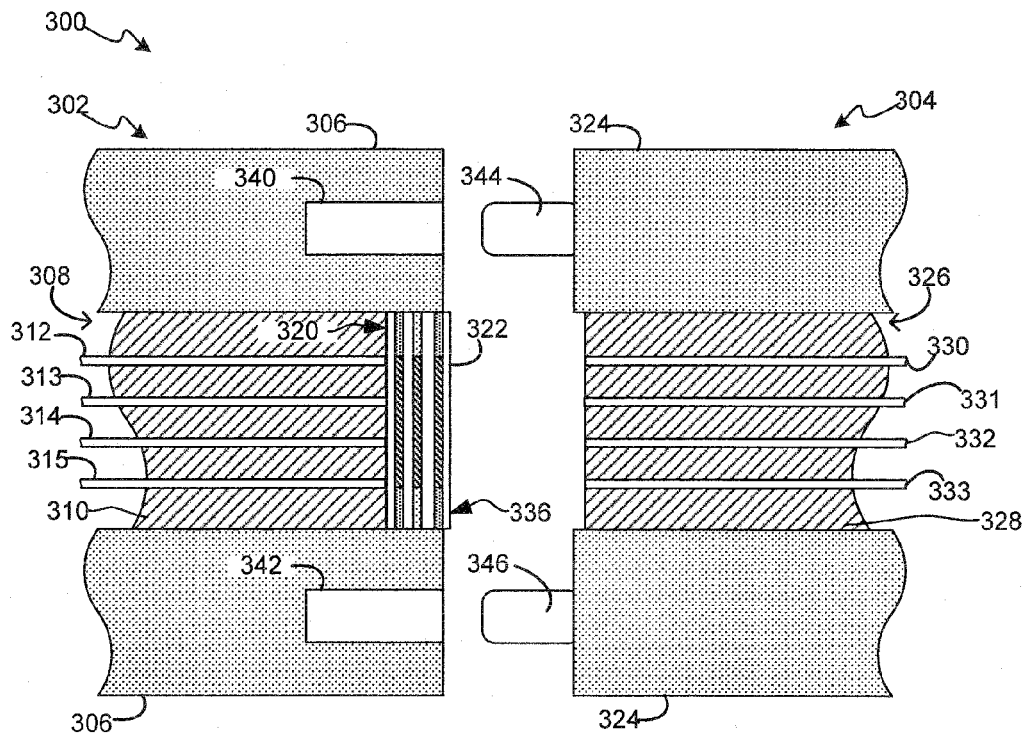
FIG. 3A is a schematic cross-sectional view of a disconnected multicore optical connector according to an example.
Figure 3B:
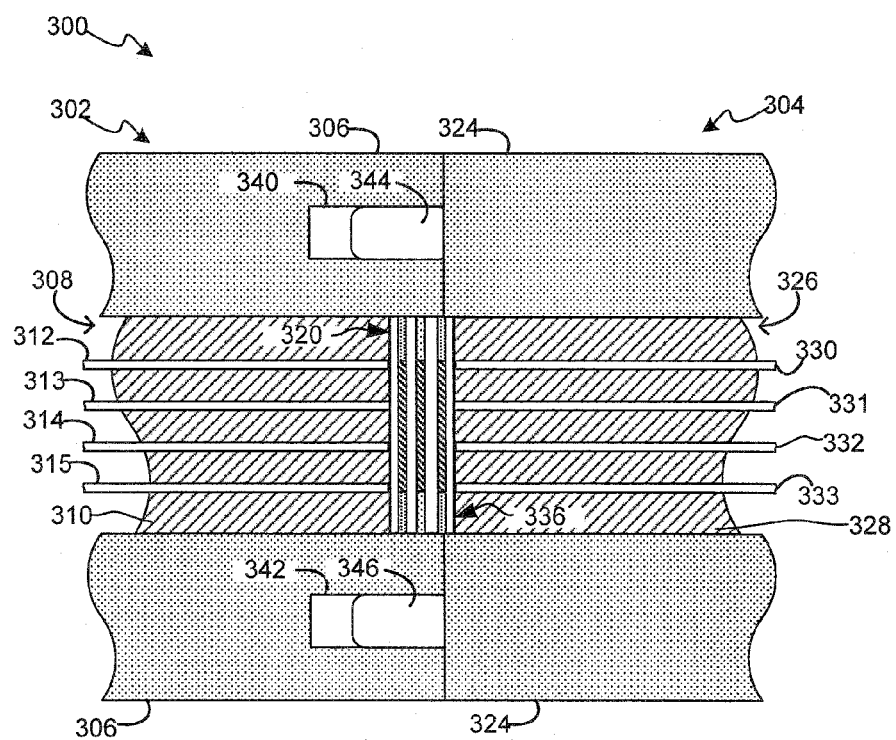
FIG. 3B is a schematic cross-sectional view of the multicore optical connector of FIG. 3A in a connected state.

FIG. 3A is a schematic cross-sectional view of a disconnected multicore optical connector 300 according to an example; FIG. 3B is a schematic cross-sectional view of multicore optical connector 300 in a connected state. In this example, connector 300 includes a first connector element 302 and a second connector element 304. First connector element 302 includes a ferrule 306 with an opening 308 for receiving a multicore optical fiber 310. Multicore optical fiber 310 includes cores 312-315. Opening 308 is arranged such that cores 312-315 may abut a first end face 320 of a SWG assembly 322 when multicore optical fiber 310 is mounted into ferrule 306. Second connector element 304 includes a ferrule 324 with an opening 326 for receiving a multicore optical fiber 328. Multicore optical fiber 328 includes cores 330-333. Opening 326 is arranged such that cores 330-333 may abut a second end face 336 of SWG assembly 322 when connector 300 is in a connected state (see FIG. 3B).

First connector element 302 and second connector element 304 may include mating elements for coupling these elements to each other when connector 300 is in a connected state. Such mating elements may collaborate to optically align optical fiber 308, SWG arrangement 322, and optical fiber 328. The mating elements may be implemented as a pin-and-hole assembly. In the illustrated example, holes 340, 342 are formed in ferrule 306 of first connector element 302, and pins 344, 346 (complementary to holes 340, 342) are formed in ferrule 324 of second connector element 304. It will be understood that other suitable mating arrangements may be provided for coupling the connector elements. For example, mating connector parts may be fixed to the ferrules through a holder and used to couple connector elements 302, 304.

FIGS. 3A and 3B above illustrate a MT optical connector for interconnecting multicore optical fibers. More specifically, SWG assembly 322 is arranged at ferrule 306 to optically couple corresponding cores of fibers 310, 328 (e.g., SWG assembly 322 is aligned to couple core 312 of multicore optical fiber 310 to core 330 of multicore optical fiber 328).

Figure 6:
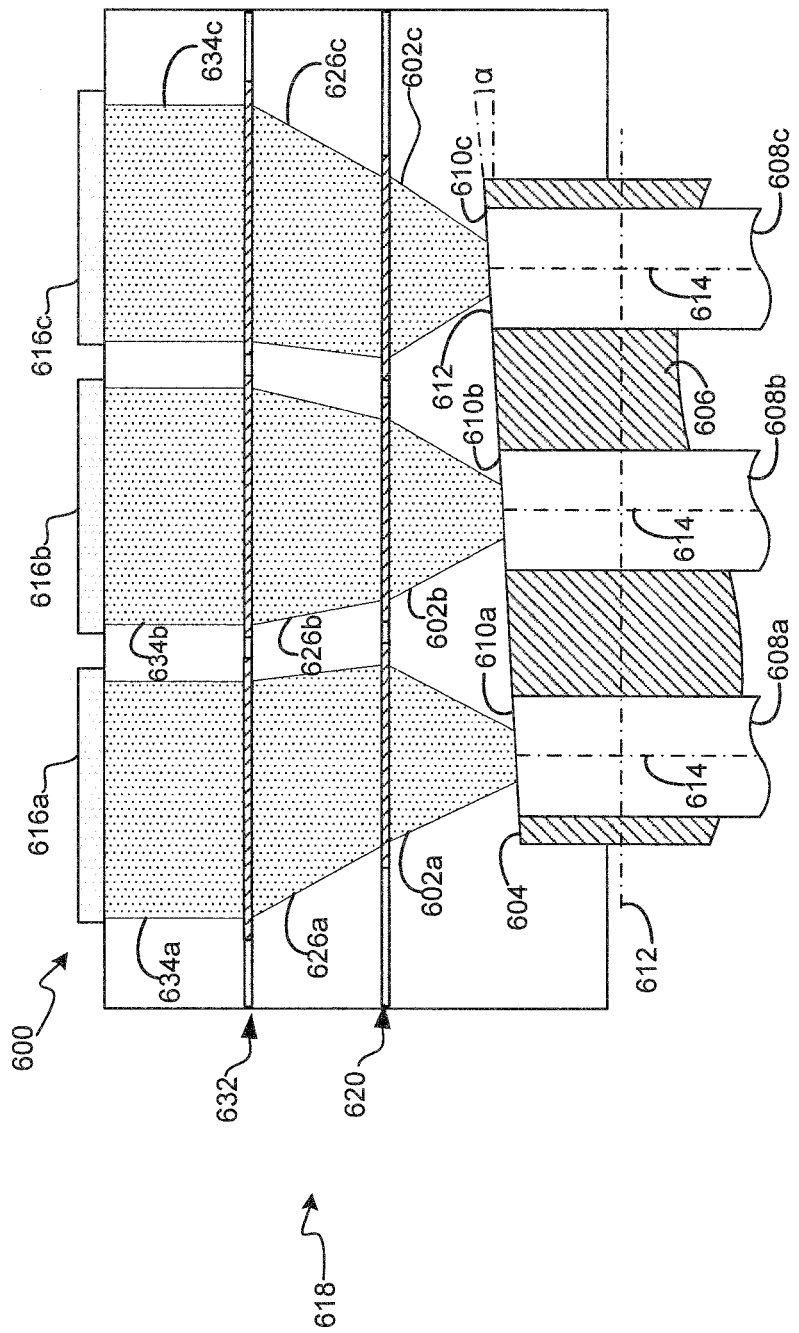
FIG. 6 is a schematic cross-sectional view of a portion of an optical connector in operation to control light beams according to yet another example.

In some applications, it is convenient to control the beams coupled into an MT connector. In particular, the spacing and/or arrangement between optical channels to be interconnected may differ in spacing and/or arrangement. A MT optical connector including a SWG assembly to control beams emitted from a plurality of channels is contemplated herein, as illustrated in FIGS. 4 to 6. Such MT optical connectors are exemplified below with respect to multicore optical fiber. It will be understood that such MT optical connectors may be used to interconnect any MT optical device.

In the examples illustrated in FIGS. 4 to 6, SWG assemblies are specifically configured to separate and collimate a plurality of beams. Such a SWG assembly may be particularly convenient for optically coupling input channels with output channels having different relative spatial separations. Such situation may, for example, arise when interconnecting a multicore optical fiber with an optical device such as a PIC or an optical transceiver.

FIG. 4 is a schematic cross-sectional view of a portion of an optical connector 400 according to an example. Optical connector 400 is shown in operation to control light beams 402a, 402b emitted from a multicore optical fiber 406. In this example, a two-core optical fiber is illustrated including cores 408a, 408b that are optically coupled to optical channels 430a, 430b through a SWG assembly 401. It will be understood that optical connector 400 may be adapted to control beams emitted from a multicore optical fiber with any number and arrangement of cores. Optical fiber 406 may be supported by a ferrule (not shown) to which SWG assembly 401 is mechanically coupled so as to be optically aligned with ends 409a, 409b of cores 408a, 408b.

SWG assembly 401 includes the following SWG sub-assemblies: (i) a SWG collimating sub-assembly 412 to individually collimate beams 402a, 402b emitted from cores 408a, 408b into collimated beams 414a, 414b; (ii) a first SWG deflection sub-assembly 418 to individually deflect beams 414a, 414b collimated at the SWG collimating sub-assembly 412 so as to separate collimated beams 414a, 414b into deflected beams 420a, 420b; and (iii) a second SWG deflection sub-assembly 424 to further deflect beams 420a, 420b deflected at first SWG deflection sub-assembly 418 into parallel beams 426a, 426b directed towards optical channels 430a, 430b. Optically channels 430a, 430b may correspond to, or be optically connected to, inputs of an optical device (not shown) to which optical fiber 406 is interconnected through connector 400.

As illustrated in FIG. 4, each SWG sub-assembly may include one or more SWG layers for controlling or shaping individual beams. For example, SWG collimating sub-assembly 412 includes a SWG layer 434 arranged to collimate incident beams 402a, 402b; first SWG deflection sub-assembly 418 includes a SWG layer 436 arranged to deflect incident beams 412a, 414a; second SWG deflection sub-assembly 424 includes two horizontally aligned SWG layers 438, 440 each of them configured to deflect, respectively, incident beams 420a, 420b.

SWG assembly 401 includes spacers 442, 444 interposed between the SWG sub-assemblies. Further, a medium 446 may be interposed between SWG collimating sub-assembly 412 and ends 409a, 409b of cores 408a, 408b; a medium 448 may be interposed between second SWG deflection sub-assembly 424 and optical channels 430a, 430b. Media 446, 448 may be provided as a solid layer similar to spacers 442, 444 so as to reduce free spaces in connector 400. As set forth above, such free spaces may be prone to contamination that may reduce optical performance of the connector. Alternatively, media 446, 448 may be air or any other suitable fluid. The refractive index of media interposed between channels of an optical connector (e.g., media 446, 448) may be matched to the refractive index of adjacent optical elements, such as adjacent cores or optical channels, in order to pre-set how beams propagate in the media.

As illustrated by FIG. 4, connector 400 may operate as follows. Cores 408a, 408b may emit diverging beams 402a, 402b. Diverging beams 402a, 402b propagate through medium 446 and impinge on SWG collimating sub-assembly 412. SWG collimating sub-assembly 412 collimates diverging beams 402a, 402b into collimated beams 414a, 414b. Collimated beams 414a, 414b propagate through spacer 442 and impinge on first SWG deflection sub-assembly 418. First SWG deflection sub-assembly 418 deflects and, thereby, separates collimated beams 414a, 414b into deflected beams 420a, 420b. Deflected beams 420a, 420b propagate through spacer 444 and impinge on second SWG deflection sub-assembly 424. Second SWG deflection sub-assembly 424 deflects beams 420a, 420b, thereby, generating parallel beams 426a, 426b directed towards optical channels 430a, 430b.

In some examples, as illustrated by FIGS. 5 and 6, a SWG assembly may function not only for separating beams but also to expand the beams so as to increase resilience of the optical connection. As set forth above, optical connectors may be susceptible to environmental conditions or mechanical instabilities. For example, changing environment conditions, or mechanical instabilities, may affect alignment of optical channels in the connector. Such issues may be addressed using beam expansion. Beam expansion provides resilience in the optical connection so that interruption of the optical connection by relative displacements of connector component is prevented. Therefore, by expanding the beam within the connector, the optical inter-connection is less susceptible to changing environmental conditions or mechanical instabilities.

Conventionally, beam expansion connectors may include a lens arrangement that expands a beam and couples the expanded beam into an output optical channel. However, such a lens arrangement may be particularly prone to contamination in free spaces formed between lenses. Contamination may disperse and/or attenuate optical signals, thereby worsening optical performance of the connector. Moreover, a lens arrangement may result in a bulky design of the connector. Last but not least, implementing a lens arrangement may significantly increase manufacturing costs. An SWG assembly as illustrated facilitates addressing such issues.

FIG. 5 is a schematic cross-sectional view of a portion of an optical connector 500 according to an example. Optical connector 500 is shown in operation to control beams 502a-502c emitted from a multicore optical fiber 508. In this example, a three-core optical fiber is illustrated including lateral cores 510a, 510c and middle core 510b. A SWG assembly 516 optically couples cores 510a-510c to optical channels 518a-518c.

SWG assembly 516 includes the following SWG sub-assemblies: (i) a SWG expanding sub-assembly 524 to individually expand beams 502a-502c, propagating through medium 540, into beams 526a-526c, and (ii) a SWG collimating sub-assembly 532 to individually collimate beams 526a-526c into collimated beams 534a-534c. SWG assembly 516 further includes spacers 544 interposed between SWG sub-assemblies 524, 532. Media 540, 542 may be provided as solid transparent layers integrated in SWG assembly 516.

As illustrated in FIG. 5, SWG expanding sub-assembly 524, in addition to beam expansion, also deflects beams 502a, 502c emitted from lateral cores 510a, 510c so as to separate lateral beams 502a, 502c from middle beam 502b. Thereby, interference between the expanded beams is prevented. Further, SWG collimating sub-assembly 532 is additionally arranged to deflect beams 526a, 526c such that collimated beams 534a-534c propagate parallelly to each other through medium 542.

Each of SWG sub-assemblies 524, 532 include SWG layers arranged to implement the above optical functions. More specifically, expanding SWG sub-assembly 524 includes SWG layers 546, 548, 550: SWG layers 546, 550 are arranged to expand and deflect, respectively, lateral beams 502a, 502c; SWG layer 548 is arranged to expand middle beam 502b. Further, SWG collimating sub-assembly 532 includes SWG layers 552, 554, 556: SWG layers 552, 556 are arranged to collimate and deflect, respectively, lateral beams 526a, 526c; SWG layer 554 is arranged to collimate middle beam 526b. The SWG layers in a sub-assembly are shown to be formed separate from each other. Alternatively, the SWG layers in a sub-assembly may be integrated in a single SWG layers with regions implementing the optical function of each individual SWG layer.

According to some examples, as illustrated in FIG. 6, the connector may be adapted to optically couple light emitted from a multicore optical fiber end with an angled facet. An angled facet refers to an end of an optical fiber cut such that its surface forms an oblique angle with respect to a longitudinal axis (e.g., axis 614 in FIG. 6) of the core ends. Angled facets prevent modal back-reflection at the core end. A SWG assembly as described herein facilitates an easy interconnection of such optical fibers with other optical devices without compromising coupling efficiency.

FIG. 6 is a schematic cross-sectional view of a portion of an optical connector 600 according to an example. Optical connector 600 is for a multicore optical fiber 606 including three cores 608a-608c with core ends 610a-610c. Optical connector 600 is illustrated in operation to control beams 602a-602c emitted from core ends 610a-610c abutting an angled facet 604 of multicore optical fiber 606. Angled facet 604 forms an angle α with respect to an emission plane 612 defined by the longitudinal axis 614 of core ends 610a-610c.

Connector 600 includes a SWG assembly 618 arranged to optically couple cores 608a-608c to optical channels 616a-616c. SWG assembly 616 is arranged similarly to SWG assembly 516: (i) a SWG expanding sub-assembly 620 is arranged to individually expand beams 602a-602c, propagating through medium 540, into beams 626a-626c, (ii) SWG expanding sub-assembly 620 is also arranged to separate lateral beams 602a, 602c from middle beam 602b, (iii) a SWG collimating sub-assembly 632 is arranged to individually collimate beams 626a-626c into collimated beams 634a-634c directed towards optical channels 616a-616c, and (iv) SWG collimating sub-assembly 632 is also arranged to deflect lateral expanded beams 626a, 626c such that collimated beams 643a-634c propagate parallelly.

The connector illustrated above with regard to FIGS. 5 and 6 are examples of expanded beam connector. In contrast to point-to-point contact connectors, which may require an exact alignment of the channels susceptible to environmental changes or mechanical instabilities, such an expanded beam connector are resilient to relative lateral displacements between the optical channels or other components of connector. Further, these connectors implement beam separation in combination with beam expansion, thereby preventing interference between the beams. Since the above connectors are based on stacked SWG layers, they may be compactly built although they implement relatively complex optical functions. Although the above examples illustrate beam expansion for MT connectors, it will be understood that beam expansion may be analogously implemented for connectors implementing a single terminal (For example, such a single-terminal connector may implement the optical functionalities of SWG assembly 516 with SWG layers 548, 554 for expanding a beam without deflection thereof similarly as illustrated for beam 502b.)

Figure 7:
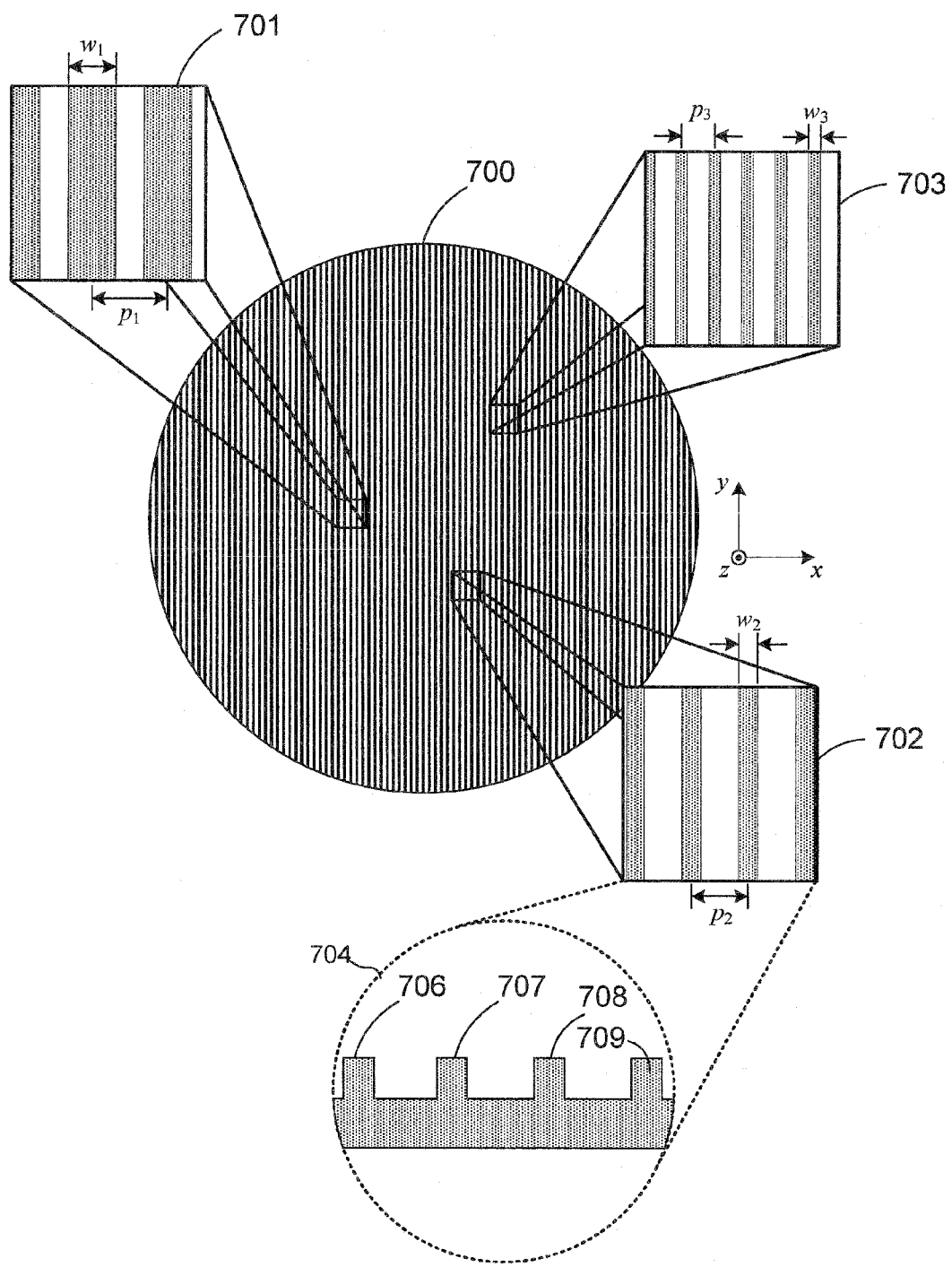
FIG. 7 shows a top plane view of a sub-wavelength (SWG) layer configured with a grating pattern according to an example.

Configuring Sub-Wavelength Gratings: FIG. 7 shows a top plane view of a SWG layer 700 configured with a grating pattern according to an example. In this example, SWG layer 700 includes a number of one-dimensional grating sub-patterns. Three grating sub-patterns 701-703 are depicted enlarged. Each grating sub-pattern includes a number of regularly arranged diffractive structures. In the depicted example, the diffractive structures are illustrated as spaced wire-like portions of SWG layer material (hereinafter referred to as "lines"). The lines extend in the y-direction and are spaced in the x-direction. An enlarged end-on view 704 of grating sub-pattern 702 is also depicted. As illustrated by end-on view 704, SWG layer 700 may be a single layer with lines, such as lines 706-709, separated by grooves formed in the layer.

A sub-pattern of a SWG layer is characterized by one or more periodic dimensions characteristic of the diffractive structure. In the illustrated example, the periodic dimensions correspond to (a) the spacing of the lines, and (b) the line width in the x-direction. More specifically, sub-pattern 701 comprises lines of width $w_1$ periodically spaced with a period $p_1$; sub-pattern 702 comprises lines with width $w_2$ periodically spaced with a period $p_2$, and the sub-pattern 703 comprises lines with width $w_3$ periodically spaced with a period $p_3$. A grating sub-patterns form a sub-wavelength grating if a characteristic dimension thereof (e.g., periods $p_1$, $p_2$, or $p_3$) is smaller than the wavelength of the particular incident light for which it is designed to operate. For example, a characteristic dimension of a SWG (e.g., periods $p_1$, $p_2$, or $p_3$) can range from 10 nm to 300 nm or from 20 nm to 1 μm. Generally, the characteristic dimensions of a SWG are chosen depending on the wavelength of the light for which a particular optical device is designed to operate.

$0^{th}$ order diffracted light from a sub-region acquires a phase $\phi$ determined by the line thickness t, and the duty cycle η, which may be defined by:

$$\eta = \frac{w}{p},$$

where w is the line width and p is the period of the lines associated with the region.

Each of the grating sub-patterns 701-703 diffract incident light differently due to the different duty cycles and periods associated with each of the sub-patterns. SWG layer 700 may be configured to interface incident light in a specific manner by adjusting the period, line width, and line thickness of the lines.

Figure 8:
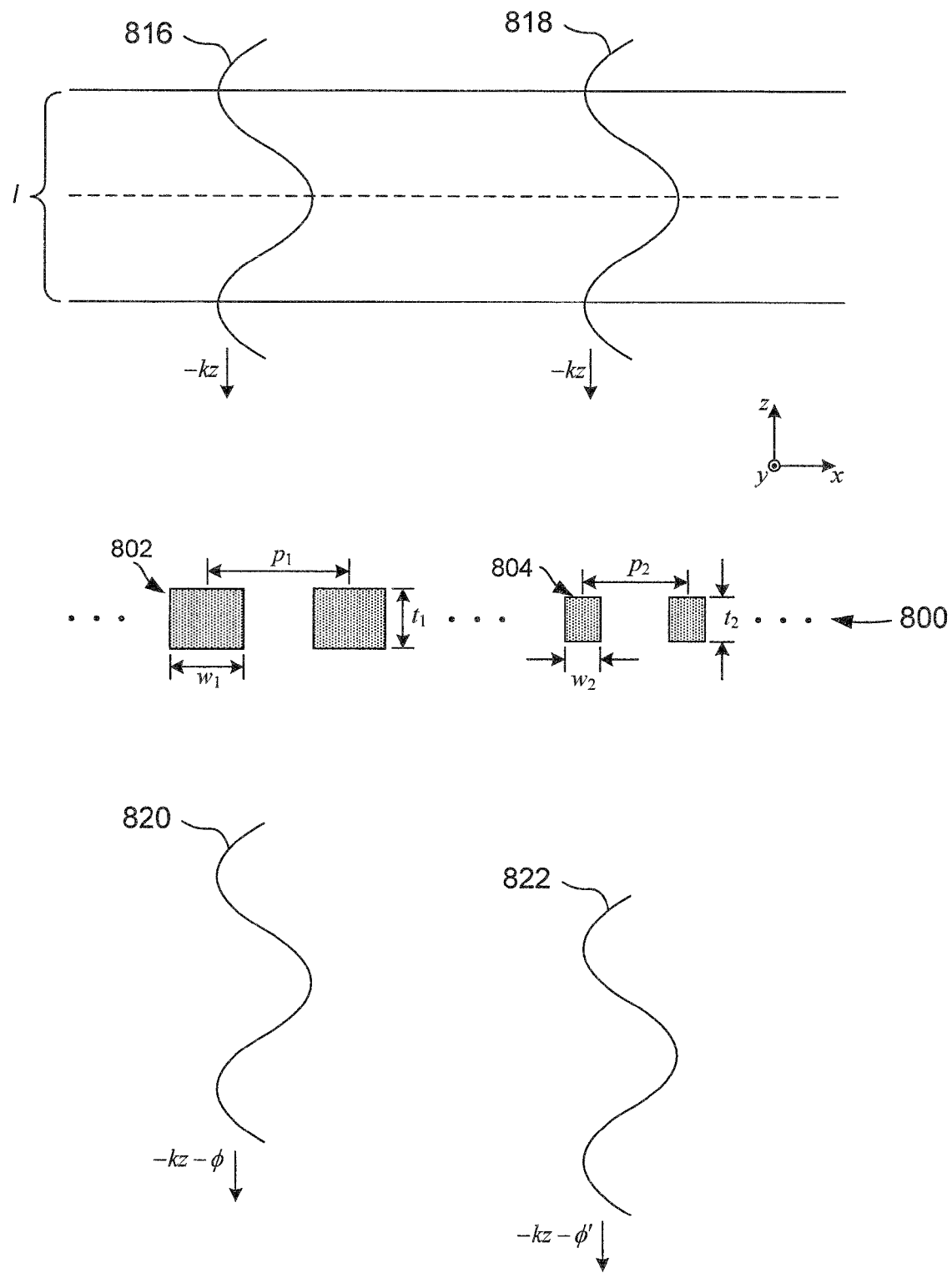
FIG. 8 shows a cross-sectional view of a SWG according to an example.

FIG. 8 shows a cross-sectional view of a SWG 800 according to an example. The Figure depicts portions of two separate grating sub-patterns 802 and 804 of SWG 800. The sub-patterns 802 and 804 can be located in different regions of SWG 800. The thickness $t_1$ of the lines of sub-pattern 802 are greater than the thickness $t_2$ of the lines of sub-pattern 804, and the duty cycle $\eta_1$ associated with the lines in sub-pattern 802 is greater than the duty cycle $\eta_2$ associated with the lines of sub-pattern 804.

FIGS. 7 and 8 illustrate SWGs based on a grating with a non-periodic sub-wavelength pattern. Such SWGs are characterized by a spatially varying refractive index, which facilitates implementing an arbitrary diffractive element. The basic principle is that light incident on a non-periodical SWG (e.g., SWG 800) may become trapped therein and oscillate for a period of time within portions of the grating. The light is ultimately transmitted through the SWG, but with the portion of light transmitted through a sub-region (e.g., sub-region 802) acquiring a larger phase shift than the portion of light transmitted through a sub-region with different characteristic dimensions (e.g., sub-region 804 with respect to sub-region 802).

As shown in the example of FIG. 8, incident wavefront 816 and 818 impinge on SWG 800 with the same phase, but a wavefront 820 is transmitted through sub-pattern 802 with a relatively larger phase shift φ than the phase shift φ' acquired by a wavefront 822 transmitted through sub-pattern 804.

In some examples, a SWG layer may be provided with reflecting layers disposed parallel to the SWG and adjacent to opposite sides thereof. Thereby, resonant cavities may be formed on both sides of the SWG. Light may then become trapped on these resonant cavities and become ultimately transmitted through the reflection layers with different phases in the beam similarly as shown in FIG. 8.

A SWG layer may be arranged with so-called polarized diffractive elements (hereinafter referred to as polarized SWG layer). In a polarized SWG layer, how light is reflected or transmitted therethrough depends on the specific polarization of incident light. More specifically, elements of the SWG may be arranged to be sensitive to polarization of incident light. The thickness and pitch of the SWG may be chosen to be polarization sensitive as described in the international patent application with publication number WO 2011/136759, which is incorporated herein by reference to the extent in which this document is not inconsistent with the present disclosure and in particular those parts thereof describing SWG design.

Alternatively, a SWG layer may be arranged with so-called unpolarized diffractive elements, so that how light is reflected or transmitted does not substantially depend on the specific polarization of incident light. More specifically, elements of the SWG may be arranged to be insensitive to polarization of incident light. Such SWG layers are referred to as unpolarized SWGs.

An unpolarized SWG is designed by an appropriate selection of the pattern dimensions. A transmission curve indicative of resonances for particular characteristics dimensions of the SWG may be used to design an unpolarized SWG. More specifically, for arranging a SWG layer with unpolarized diffractive elements, plots of transmittance and phase shift as a function of duty cycle for a particular design of a SWG layer may be obtained. Resonances for particular duty cycle values may be identified in these plots. (Resonances correspond to duty cycle values, where the reflection peaks and the transmission drops while undergoing a phase jump.) Generally, between these two resonances, the transmission is high and the transmitted phase varies smoothly. Using this data, an unpolarized transmissive SWG can be designed. More specifically, the dimensions of diffractive elements in the SWG layer may be chosen such that the transmission characteristics of sub-patterns of the grating are comprised between resonances in the transmission curves so that a SWG is insensitive to polarization of an incident wavefront.

Following the above procedures, an unpolarized SWG layer may be arranged to control a wavefront incident thereon or to perform other optical functions such as focusing, collimating, or expanding a wavefront incident thereon. The basic principle is to choose the dimensions of the dimensions of diffractive elements in the SWG such that the transmission characteristics of sub-patterns of the grating are comprised between resonances in the transmission curves. Moreover, using such design approach, a SWG layer may be arranged with a low aspect ratio such as an aspect ratio below 10:1 or, more specifically, an aspect ratio below 5:1 or, even more specifically, an aspect ratio below 1:1. Thereby, it is facilitated a straightforward mass production of SWG layers using micro-fabrication processes such as deep-UV or nano-imprint lithography.

Some examples of SWG layers with unpolarized diffractive elements are illustrated the article titled "A Silicon Lens for Integrated Free-Space Optics," by Fattal et al. published in Integrated Photonics Research, Silicon and Nanophotonics, OSA Technical Digest (CD) (Optical Society of America, 2011), which is incorporated herein by reference to the extent in which this document is not inconsistent with the present disclosure and, in particular, those parts thereof describing SWG design. It will be understood that the examples illustrated in this article may be generalized for a vast variety of SWG geometries such as the SWG geometries illustrated with respect to FIGS. 7, 10A, or 13A.

Figure 9:
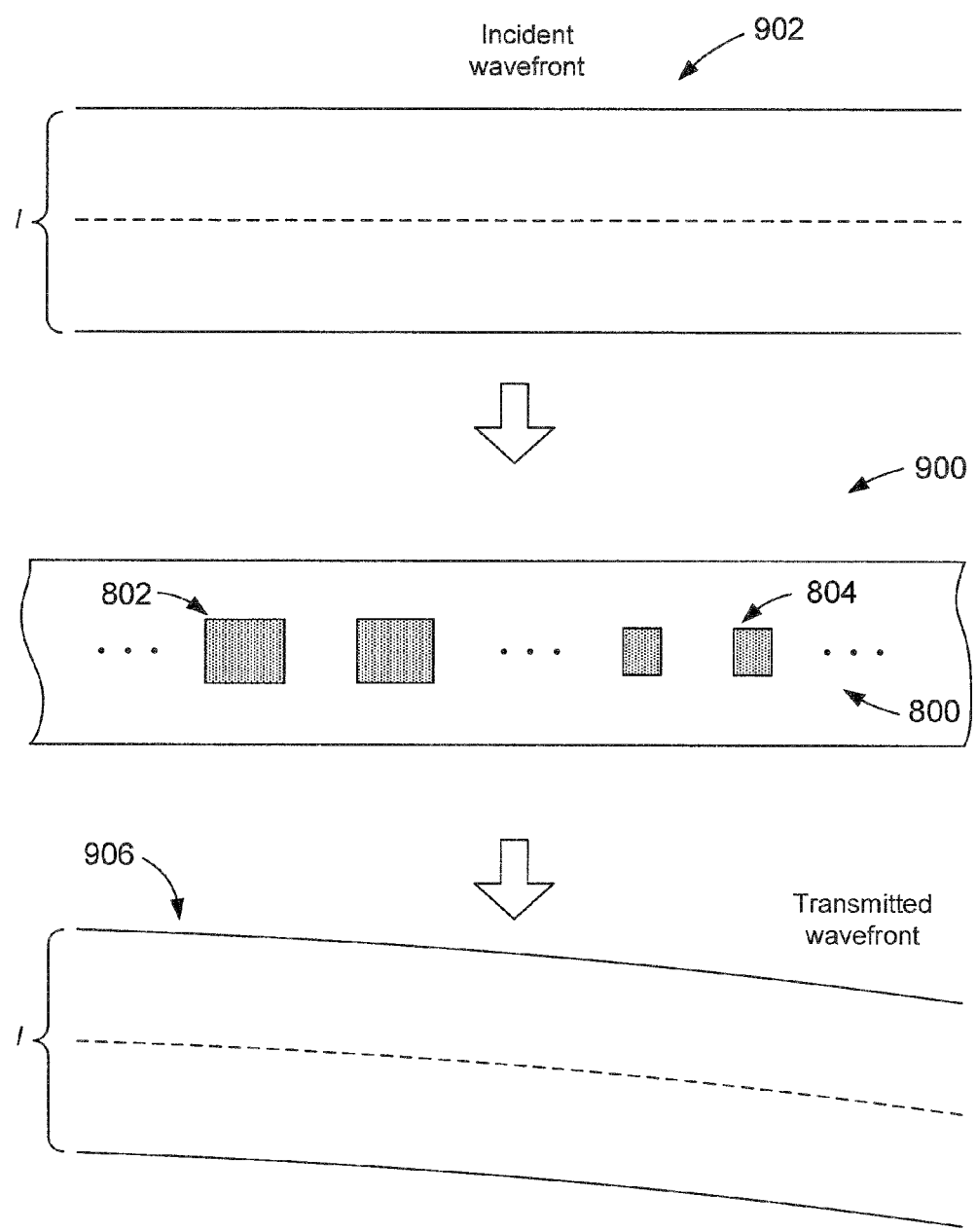
FIG. 9 shows a cross sectional view of a SWG layer in operation illustrating how a transmitted wavefront may be changed according to an example.

FIG. 9 shows a cross sectional view of a SWG layer 900 in operation illustrating how a transmitted wavefront may be changed according to some examples. In the example, incident light with a substantially uniform wavefront 902 impinges on SWG layer 900 producing transmitted light with a curved transmitted wavefront 906. Transmitted wavefront 906 results from portions of incident wavefront 902 interacting with sub-region 802 of SWG 800 with a relatively larger duty cycle $\eta_1$ and thickness $t_1$ than portions of incident wavefront 902 interacting with sub-region 804 of SWG 800 with a relatively smaller duty cycle $\eta_2$ and thickness $t_2$. The shape of the transmitted wavefront 906 is consistent with the larger phase acquired by light interacting with sub-region 802 relative to the smaller phase shift acquired by light interacting with the sub-region 804.

Therefore, a SWG layer may be configured to provide arbitrary phase front shape modulation. Thereby, a SWG layer may be implemented in an optical device as described herein to implement a vast variety of optical functions. These functions may include, but are not limited to, deflecting a beam, splitting a beam into spectral components, filtering one or more spectral components in a beam, polarizing a beam, focusing or defocusing a beam, or collimating a beam with a non-parallel wavefront. In the following, some examples of SWG layers configured to implements these functions are illustrated.

A non-periodical SWG may be configured so that the SWG layer operates like a prism, i.e. controlling incident light by producing transmitted light that is deflected relative to the incident light. Such a SWG may be realized by forming a pattern with a duty cycle progressively varying in one direction.

Figure 10A:
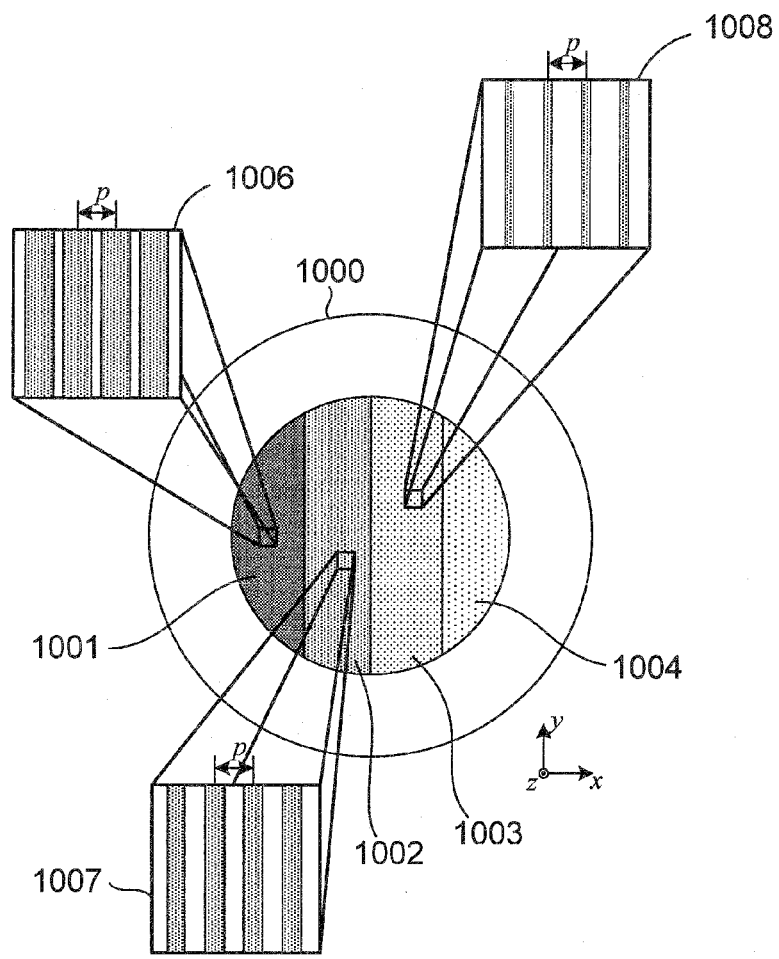
FIG. 10A shows a top plan view of a SWG layer configured according to an example.
Figure 10B:
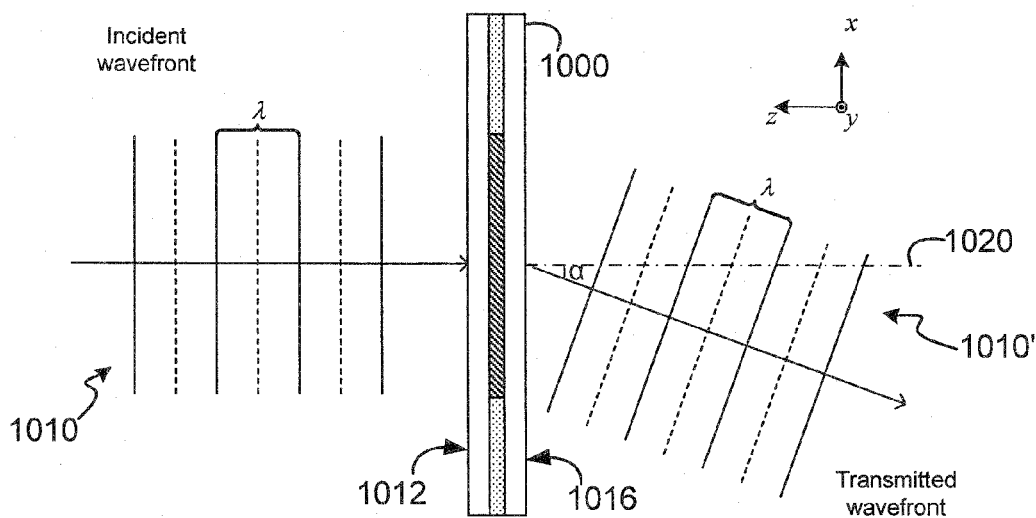
FIG. 10B shows a cross-sectional view of the SWG layer of FIG. 10A in operation.

FIG. 10A shows a top plan view of a one-dimensional grating pattern of a SWG layer 1000 configured to be operated as a prism for normal incident light of an appropriate wavelength; FIG. 10B shows a cross-sectional view of SWG layer 1000 in operation. A non-periodic SWG of SWG layer 1000 includes regions 1001-1004, with each region formed from lines extending in the y-direction, having the same period, but with the duty cycle progressively decreasing from region 1001 to region 1004. Enlargements 1006-1008 show that line period spacing p is the same throughout, but the lines of region 1001 have a relatively larger duty cycle than the lines of region 1002, which have a larger duty cycle than the lines of region 1003. The duty cycles for regions 1001-1004 are selected such that the resulting phase change in transmitted light is largest for region 1001 and decreases from region 1001 to region 1004.

As depicted in FIG. 10B, the phase change causes a parallel wavefront 1010 (corresponding to a beam of light with wavelength $\lambda$ directed normal to an input surface 1012 of SWG layer 1000) to be transmitted through an output surface 1016 of SWG layer 1000 as a transmitted wavefront 1010' travelling with an angle $\alpha$ away from a surface normal 1020.

In examples, a non-periodical SWG configured to operate like prism may act as a beam splitter when light including multiple spectral components impinges thereon.

Figure 11:
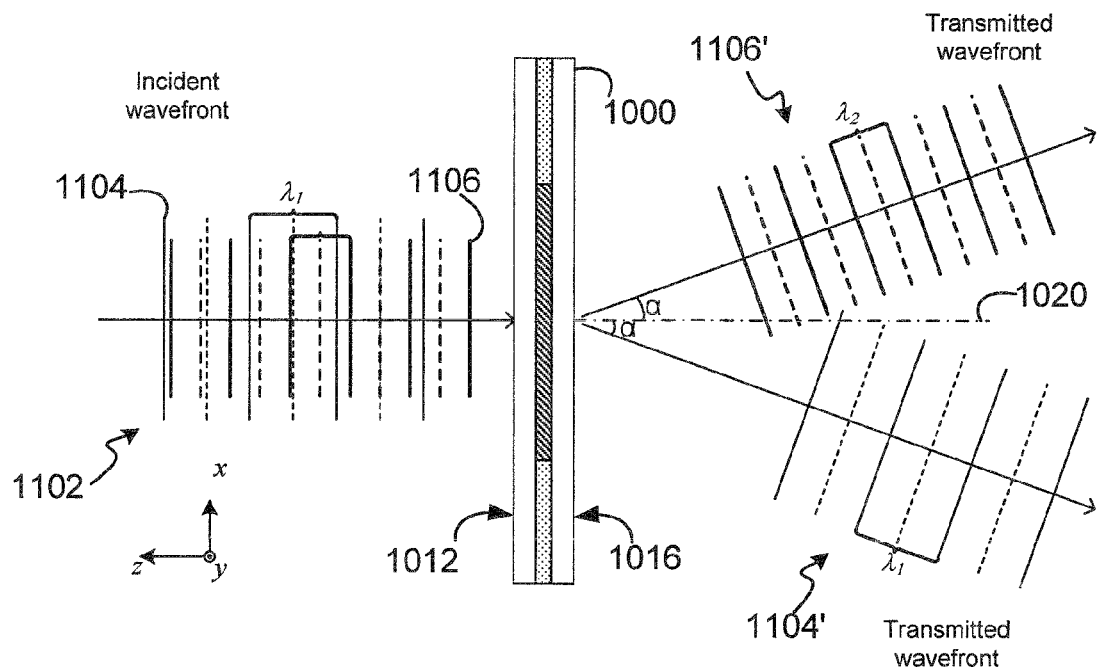
FIG. 11 shows a cross-sectional view of the SWG layer of FIG. 10A in operation for splitting a multiple component wavefront.

FIG. 11 shows a cross-sectional view of SWG layer 1000 in operation for splitting a wavefront 1102 composed of multiple spectral components. In the illustrated example, wavefront 1102 includes (i) a first spectral component 1104 corresponding to light of wavelength $\lambda_1$ (illustrated with thin lines), and (ii) a second spectral component 1106 corresponding to light of wavelength $\lambda_2$ (illustrated with thick lines). SWG layer 1000 induces different phase changes to the different spectral component of the incident wavefront since interaction of light with the grating pattern is wavelength dependent.

The diffractive features of SWG layer 1000 may be designed to control a multiple-component wavefront as required for a particular application thereof. In the example depicted in FIG. 11, SWG layer 1000 is designed to control wavefront 1102 such that the spectral components thereof are deflected at symmetrical angles $\alpha$. More specifically, the phase change induced by SWG layer 1000 causes (i) the spectral component 1104 of wavefront 1102, corresponding to a beam of light with wavelength $\lambda_1$, to be transmitted through output surface 1016 as a transmitted wavefront 1104' propagating with an angle $\alpha$ away in the clockwise direction from surface normal 1020, and (ii) spectral component 1106 of wavefront 1102, corresponding to a beam of light with wavelength $\lambda_2$, to be transmitted through output surface 1016 as a transmitted wavefront 1106' propagating with an angle $\alpha$ in the counter-clockwise direction away from surface normal

1020. It will be understood that a SWG layer may be designed to split a multiple-component wavefront in any manner as required for implementing a specific function in an optical device. In examples, a non-periodical SWG of a SWG layer may be configured to control an incident wavefront by operating like a filter element when light including multiple spectral components impinges thereon.

Figure 12:
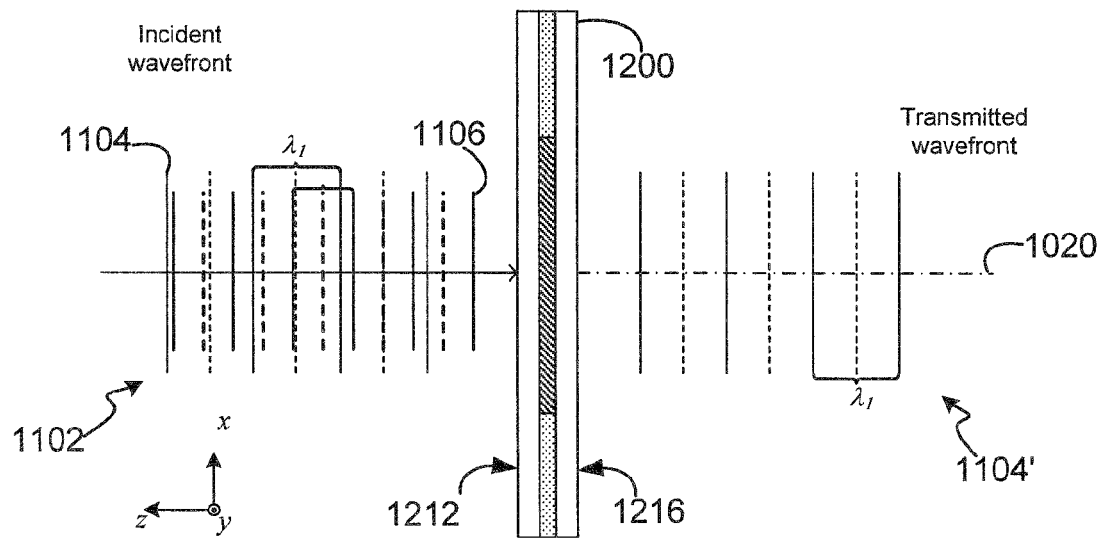
FIG. 12 shows a cross-sectional view of another example of a SWG layer in operation for filtering a spectral component of a multiple component wavefront.

FIG. 12 shows a cross-sectional view of SWG layer 1200 in operation for filtering a particular spectral component of a wavefront 1102 composed of spectral components 1104, 1106 described with respect to FIG. 11. SWG layer 1200 induces different phase changes to the different spectral component of the incident wavefront since interaction of light with the grating pattern is wavelength dependent. The diffractive features of SWG layer 1200 may be specifically chosen to selectively filter a multiple-component wavefront as required for a particular application thereof. In the example depicted in FIG. 12, SWG layer 1200 is designed to control wavefront 1102 such that spectral components with wavelength $\lambda_2$, or close thereto, are blocked and spectral components with other wavelengths are transmitted therethrough. More specifically, the phase change induced by SWG layer 1200 causes (i) the spectral component 1104 of wavefront 1102, corresponding to a beam of light with wavelength $\lambda_1$, to be transmitted through output surface 1116 without deflection, and (ii) the spectral component 1106 of wavefront 1102, corresponding to a beam of light with wavelength $\lambda_2$, to be absorbed by the grating. It will be understood that a SWG layer may be designed to filter a multiple-component wavefront in any manner as required for implementing a specific function in an optical device. For example, the SWG layer may filter some spectral components while splitting other spectral components.

In examples, a non-periodical SWG of a SWG layer may be configured such that the SWG layer operates like a lens, which might be configured for, for example, focusing, collimating, or expanding an incident beam. Such a SWG layer operating as a lens may be realized by forming a SWG pattern with a duty cycle symmetrically varying with respect to an axis of symmetry, the axis of symmetry defining an optical axis of the SWG layer. Examples of such SWG layers are illustrated with respect to FIGS. 13A-13B.

Figure 13A:
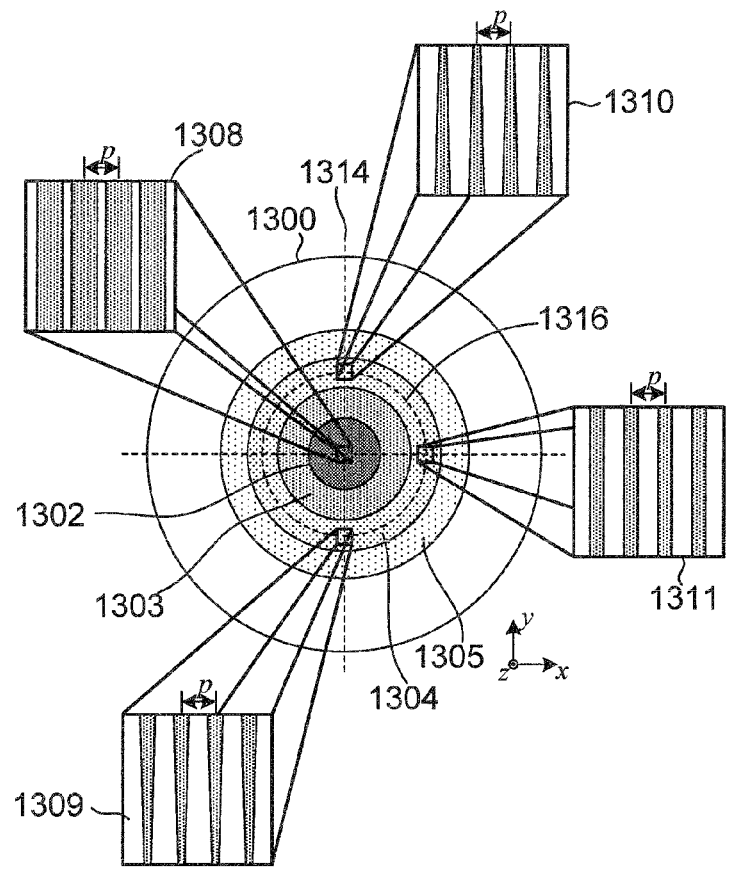
FIG. 13A shows a top plan view of a SWG layer configured according to another example.
Figure 13B:
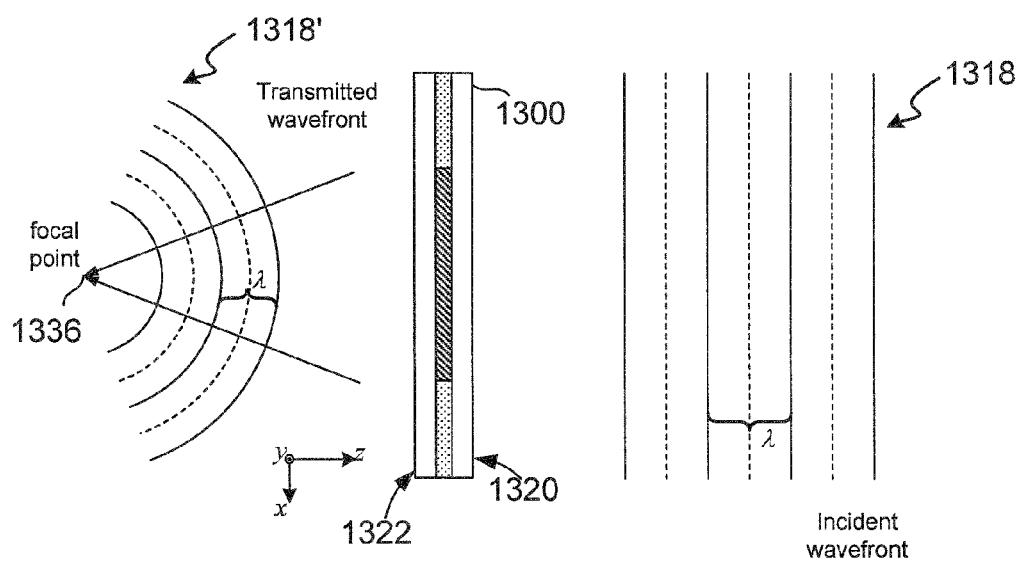
FIG. 13B shows a cross-sectional view of the SWG layer of FIG. 13A in operation.

FIGS. 13A and 13B illustrate a SWG layer 1300 arranged to be operated as a lens. More specifically, SWG layer 1300 can be operated as a convex lens for focusing incident light. FIG. 13A shows a top plan view of a one-dimensional grating pattern of SWG layer 1300 configured to focus incident light into a focal point 1336 by appropriately tapering the lines of the grating away from the center of SWG-layer 1300; FIG. 13B shows a cross-sectional view of SWG layer 1300 in operation.

SWG layer 1300 includes a non-periodical SWG with a grating pattern represented by annular shaded regions 1302-1305. Each shaded annular region represents a different grating sub-pattern of lines. Enlargements 1308-1311 show that the SWG includes lines tapered in the y-direction with a constant line period spacing p in the x-direction. More specifically, enlargements 1308-1310 are enlargements of the same lines running parallel to dashed-line 1314 in the y-direction. Enlargements 1308-1310 reveal that the line period spacing p remains constant but the width of the lines narrow or taper away from the center of the SWG in the y-direction. Each annular region has the same duty cycle and period. For example, enlargements 1308-1311 reveal portions of annular region 1304 comprising portions of different lines that have substantially the same duty cycle. As a result, each portion of an annular region produces the same approximate phase shift in the light transmitted through SWG layer 1300. For example, dashed circle 1316 represents a single phase shift contour in which light transmitted through the SWG layer anywhere along the circle 1316 acquires substantially the same phase $\phi$.

As depicted in FIG. 13B, the phase change causes a parallel wavefront 1318, corresponding to a beam of light with wavelength $\lambda$ directed normal to an input surface 1312 of SWG layer 1300, to be transmitted through an output surface 1322 of SWG layer 1300 as an output wavefront 1318' converging towards focal point 1336.

A SWG layer is not limited to one-dimensional gratings as illustrated with respect to FIGS. 7, 10A-13B. A SWG layer can be configured with a two-dimensional non-periodical SWG so that the SWG layer can be operated to implement a specific wavefront control function or other optical functions such as focusing, expanding, or collimating an incident beam. In examples, a non-periodical SWG is composed of posts rather lines, the posts being separated by grooves. The duty cycle and period can be varied in the x- and y-directions by varying the post size. In other examples, a non-periodical SWG layer is composed of holes separated by solid portions. The duty cycle and period can be varied in the x- and y-directions by varying the hole size. Such post or holes may be arranged according to a variety of shapes such as circular or rectangular shapes.

Further, SWG layers may be arranged to operate as a lens through a diffractive pattern comprised of concentric rings. More specifically, such SWG layers include concentric rings formed from a dielectric material interleaved by a plurality of gaps separating the plurality of concentric rings. Further, such SWG layers may include a disc formed at, approximately, the center of the lens that is formed from the dielectric material. The disc may have a thickness similar to the thickness of the plurality of concentric rings. The dielectric material layer may include silica. The thickness, gap spacing, ring width, and ring number are selected to determine the optical characteristics (e.g., focal length) associated with the lens.

As illustrated above, a SWG layer can be arranged to implement a particular optical function by appropriately designing a phase change induced to an incident wavefront. There are a number of ways for designing the induced phase change. In an example, for configuring the SWG layer, a transmission profile may be determined using an appropriate computing tool, such as the application "MIT Electromagnetic Equation Propagation" ("MEEP") simulation package to model electromagnetic systems, or COMSOL Multiphysics® which is a finite element analysis and solver software package that can be used to simulate various physics and engineering applications. A determined transmission profile may be used to uniformly adjust geometric parameters of the entire SWG layer in order to produce a particular change in the transmitted wavefront.

Manufacturing Optical Fiber Connector: FIG. 14 illustrates examples of a method 1400 for manufacturing an optical fiber connector. The optical fiber connector is for optically coupling a beam into or out of an optical fiber. In discussing FIG. 14, reference is made to the schematic views in FIGS. 15A and 15B to provide contextual examples. Implementation of method 1400, however, is not limited to those examples. FIG. 15A is a schematic isometric view depicting (i) a ferrule 1500 for a MT connector, and (ii) a SWG assembly 1502 decoupled from ferrule 1500. FIG. 15B is a schematic isometric view of a MT optical connector 1504 including ferrule 1500 with SWG assembly 1502 coupled thereto.

In this example connector 1504 is a three terminal connector. Ferrule 1500 is arranged for receiving three optical fibers 1506-1508. Further, SWG assembly 1502 includes three optical coupling regions 1510-1513, each region corresponding to a terminal of connector 1504. Each coupling region 1510-1513 includes a stack of SWG layers arranged to perform a combination of optical function suitable to couple light from a corresponding optical fiber to a corresponding optical channel (not shown) of connector 1504, analogously as described above. The coupling regions are disposed at SWG assembly 1502 such that they can be aligned with respective optical fibers at ferrule 1500. (For example, coupling region 1510 is disposed to be aligned with optical fiber 1506 when SWG assembly 1502 is mounted onto ferrule 1500.)

Although connector 1504 is illustrated as a MT connector for three terminals, connector 1504 may be adapted to interconnect any number of terminals required for a particular optical application. That is, ferrule 1500 may be adapted to receive any number of optical fibers, and SWG assembly 1502 may include any corresponding number of optical coupling regions. Further, connector 1504 may be for a single optical fiber. The single optical fiber may include a single core, or multiple cores.

At 1402, SWG assembly 1502 is coupled to ferrule 1500. At 1404 SWG assembly 1502 is aligned to optically couple optical fibers 1506-1508 to corresponding optical channels (not shown) of connector 1504. In the illustrated example, coupling 1402 and aligning 1404 are performed quasi-simultaneously. More specifically, ferrule 1500 may include a socket 1514 adapted to receive SWG assembly 1502 such that it is automatically aligned to optical fibers 1506-1508 when mounted onto socket 1514. That is, socket 1514 may be dimensioned and positioned such that when SWG assembly 1502 is inserted therein, coupling regions 1510-1512 are aligned to corresponding optical fibers 1506-1508. Additionally to these steps, coupling 1402 may include fixing SWG assembly 1502 to the ferrule. Fixing may include bonding the assembly to the ferrule or activating a fixing device such as a clamp or the like.

Coupling 1402 and aligning 1404 may be performed in a number of different ways. Further, aligning 1404 may be performed without using a socket in the ferrule. For example, SWG assembly 1502 may be brought into contact with a flat surface of ferrule 1500 where optical fibers 1506-1508 end and, subsequently, the SWG assembly may be aligned with optical fiber 1506-1508 using an active alignment system (e.g., using a combination of a fiducial arrangement at the ferrule and a machine vision system).

There are a number of ways of manufacturing a SWG assembly as described herein. For example, a SWG assembly may be manufactured using micro-fabrication techniques such as lithography, imprint processes, layer deposition, or a combination thereof.

In some examples, one or more SWG layers may be formed on a transparent substrate using such micro-fabrication techniques. For example, a first SWG layer may be formed on a side of the substrate. Additional SWG layers may be formed over the first SWG layer by a process combining film deposition and lithography.

In further examples, a first SWG layer may be formed on a first side of the substrate and a second SWG layer may be formed on a second side of the substrate opposite to the first side. Additional SWG layers may be formed over any of the first or second SWG layers.

In other examples, a first SWG layer and the first substrate form part of a first integrated structure; a second SWG layer is formed on a second substrate, the second SWG layer and the second substrate form part of a second integrated structure. To form a SWG assembly as described herein, the first integrated structure and the second integrated structure may bonded to form a single integral device. Further SWG layers may be integrated in the device by bonding of further integrated structures.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover modifications and variations of the illustrated examples. Specifically, it will be understood that the number and arrangement of SWG layers illustrated above are chosen to describe some particular examples. Optical devices are contemplated that include any number and arrangement of SWG layers suitable to implement a particular connectability between optical components. Further, some of the examples herein illustrate beam expansion connectors, however it will be understood that optical connectors contemplated herein are not limited to this type of connectors. Connectors according to examples may implement a variety of functions such as beam separation, beam splitting, filtering of spectral components, beam polarization, or combinations of such optical functionalities within an optical connector.

Claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. An optical device comprising:
   an input optical channel and a corresponding output optical channel; and
   an assembly of stacked sub-wavelength grating (SWG) layers aligned to optically couple the input optical channel to the output optical channel,
   wherein the optical device is a multiple terminal optical device including a plurality of input optical channels and a plurality of corresponding output optical channels, the SWG assembly being aligned to optically couple the plurality of input optical channels to the plurality of output optical channels.

2. The device of claim 1, wherein the device is a multicore optical fiber optical connector.

3. The device of claim 1, wherein the SWG assembly is arranged to deflect beams emitted from the input optical channels to separate the optical beams.

4. The device of claim 1, wherein the SWG assembly includes a SWG sub-assembly to collimate a beam emitted from the input optical channel.

5. The device of claim 1, wherein the SWG assembly includes a SWG sub-assembly to deflect a beam emitted from the input optical channel.

6. The device of claim 1, wherein the device is an expanded beam connector.

7. The device of claim 1, wherein the SWG assembly includes a transparent solid layer separating stacked SWG layers.

8. The device of claim 1, wherein a SWG grating layer of the SWG assembly includes a non-periodic SWG layer arranged to shape or control a beam from the input optical channel.

9. A multicore optical fiber connector comprising:
   a ferrule for receiving a multicore optical fiber;
   a plurality of optical channels; and
   a SWG assembly including a plurality of stacked SWG grating layers, each of the SWG layers including a non-periodic SWG layer, the SWG assembly being arranged to optically couple cores of the multicore optical fiber to channels of the plurality of optical channels.

10. The connector of claim 9, wherein the SWG assembly includes
a SWG expanding sub-assembly to individually expand beams emitted from the plurality of cores, and
a SWG collimating sub-assembly to individually collimate beams expanded at the SWG expanding sub-assembly.

11. The connector of claim 9, wherein the SWG assembly includes
a SWG collimating sub-assembly to individually collimate beams emitted from the plurality of cores,
a first SWG deflection sub-assembly to individually deflect beams collimated at the SWG collimating sub-assembly so as to separate the collimated beams, and
a second SWG deflection sub-assembly to further deflect the beams deflected at the first SWG deflection sub-assembly towards the plurality of optical channels.

12. The connector of claim 9, wherein the connector is adapted to optically couple light emitted from a multicore optical fiber end with an angled facet.

13. A method of manufacturing an optical fiber connector for optically coupling a beam into or out of an optical fiber, the method comprising:
coupling an assembly of stacked SWG layers to a ferrule, the ferrule being to receive an optical fiber;
aligning the SWG assembly to optically couple the optical fiber to an optical channel of the connector through the SWG assembly,
wherein the connector is for individually coupling a plurality of beams into or out cores of a multicore optical fiber, the ferrule being to receive the multicore optical fiber.

14. An optical device comprising:
a first element distinct; and a second element, wherein the first element is distinct from the second element,
wherein the first element includes an input optical channel, and the second element includes a corresponding output optical channel,
wherein the first element and the second element include mating elements to couple the first element to the second element,
wherein the first element further includes an assembly of stacked sub-wavelength grating (SWG) layers aligned to optically couple the input optical channel to the output optical channel when the first element is coupled to the second element.

15. The device of claim 14, wherein the SWG assembly includes a SWG sub-assembly to collimate a beam emitted from the input optical channel.

16. The device of claim 14, wherein the SWG assembly includes a SWG sub-assembly to deflect a beam emitted from the input optical channel.

17. The device of claim 14, wherein the device is an expanded beam connector.

18. The device of claim 14, wherein the SWG assembly includes a transparent solid layer separating stacked SWG layers.

19. The device of claim 14, wherein a SWG grating layer of the SWG assembly includes a non-periodic SWG layer arranged to shape or control a beam from the input optical channel.

* * * * *